United States Patent [19]
Cassone

[11] Patent Number: 5,080,046
[45] Date of Patent: Jan. 14, 1992

[54] DISPOSABLE CANINE LAVATORY

[76] Inventor: Rudolph Cassone, 292 Bay 11th St., Brooklyn, N.Y. 11228

[21] Appl. No.: 620,353

[22] Filed: Nov. 29, 1990

Related U.S. Application Data

[63] Continuation-in-part of Ser. No. 421,665, Oct. 16, 1989, Pat. No. 4,986,218.

[51] Int. Cl.$^5$ .............................................. A01K 29/00
[52] U.S. Cl. ...................................... 119/168; 119/165
[58] Field of Search ................................ 119/161–170

[56] References Cited

U.S. PATENT DOCUMENTS

| | | | |
|---|---|---|---|
| 1,773,141 | 8/1930 | Hodgson | 119/169 |
| 4,711,198 | 12/1987 | Mossbarger | 119/168 |
| 4,976,218 | 12/1990 | Cirami | 119/168 |

FOREIGN PATENT DOCUMENTS

| | | | |
|---|---|---|---|
| 2638435 | 3/1978 | Fed. Rep. of Germany | 119/168 |
| 2599585 | 12/1987 | France | 119/168 |

*Primary Examiner*—John G. Weiss
*Attorney, Agent, or Firm*—Richard L. Miller

[57] ABSTRACT

A disposable canine lavatory is provided and consists of a foldable thin waterproof box shaped with a base member that will catch excrement from a dog so that the lavatory with the excrement therein can be disposed of. A deflection member which is integral with the base member will direct urine from a male dog into the base member for easy disposal thereof.

2 Claims, 1 Drawing Sheet

DISPOSABLE CANINE LAVATORY

BACKGROUND OF THE INVENTION

This application is a continuation in part of previous filed copending application with serial number 07/421,665 filed Oct. 16, 1989, for which a notice of allowance for issuance as a patent was mailed on Aug. 30, 1990 now U.S. Pat. No. 4,986,218.

The instant invention relates generally to animal toilets and more specifically it relates to a disposable canine lavatory.

Numerous animal toilets have been provided in the prior art that are adapted to receive excrement released by pets. For example, U.S. Pat. Nos. 3,964,437 to Brown; 4,117,555 to Dennis; 4,181,096 to Grubman; 4,185,861 to Brener; 4,715,320 to Barnhart and 4,836,141 to Whitfield all are illustrative of such prior art. While these units may be suitable for the particular purpose to which they address, they would not be as suitable for the purpose of the present invention as hereafter described.

SUMMARY OF THE INVENTION

A primary object of the present invention is to provide a disposable canine lavatory that will overcome the shortcomings of the prior art devices.

Another object is to provide a disposable canine lavatory that can be opened so that the animal can deposit excrement therein and then the lavatory can be folded up so that the lavatory with the excrement can be disposed of quickly.

An additional object is to provide a disposable canine lavatory that includes a deflection member to direct urine from a male dog into the lavatory for proper disposal.

A further object is to provide a disposable canine lavatory that is simple and easy to use.

A still further object is to provide a disposable canine lavatory that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENTS

Figures 1, 2, 3:
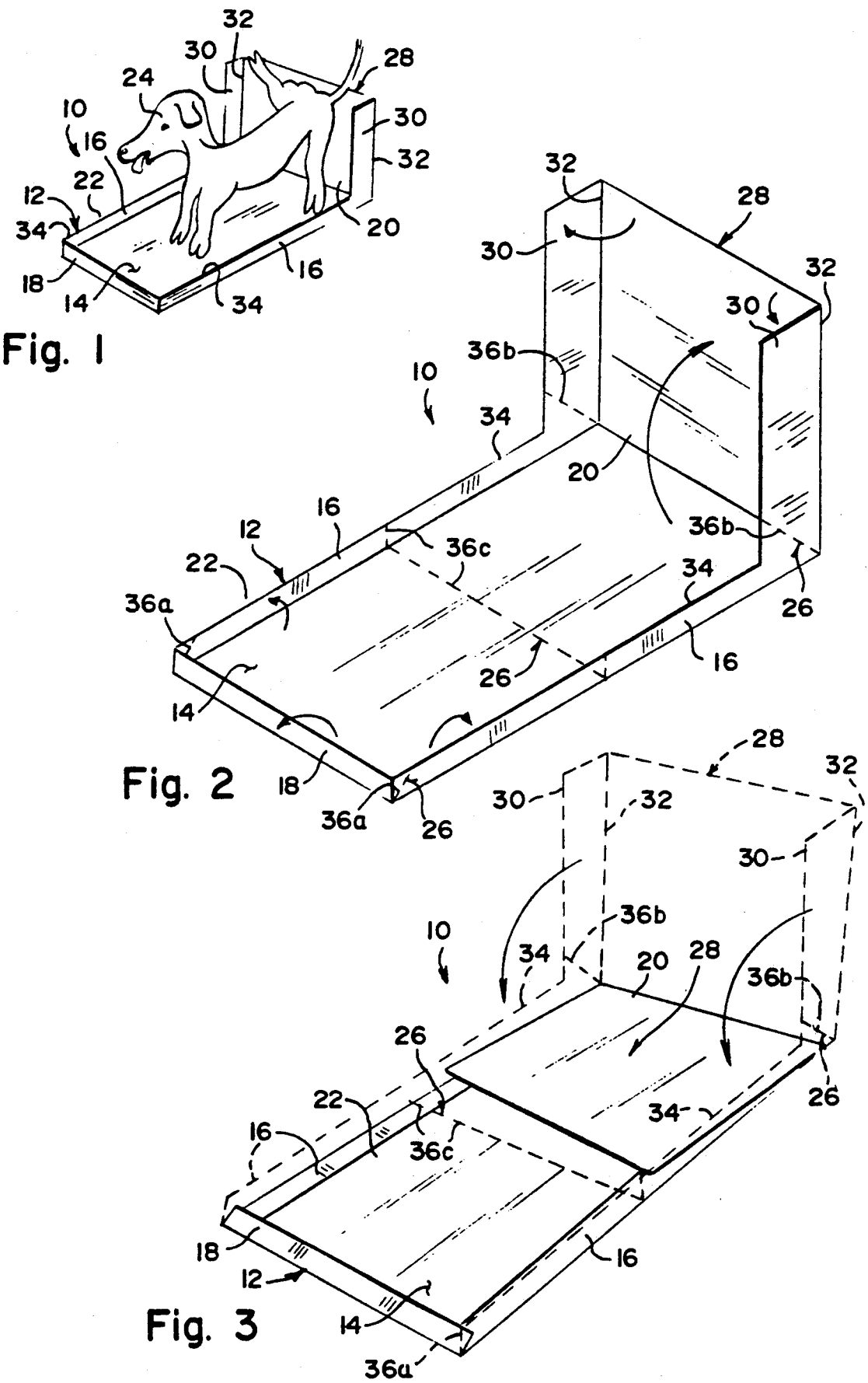
FIG. 1 is a perspective view of the instant invention in use showing a dog urinating therein.
FIG. 2 is a diagrammatic view illustrating the instance invention unfolded and ready for use.
FIG. 3 is a similar diagrammatic view of the instant invention in a partially folded position.

Turning now descriptively to the drawings, in which like reference characters denote like elements throughout the several views, the Figures illustrate a disposable canine lavatory 10 consisting of a box shaped with base member 12 having a bottom wall 14, a pair of side walls 16, a front wall 18, a rear wall 20 and an open top 22 being of a size to receive a dog 24 thereon, so that the base member 12 can catch excrement from the dog 24.

A mechanism 26 is provided for allowing the base member 12 to be folded up so that the lavatory 10 will be more compact for shipping and storage purposes before use as well as for the ease of disposal the excrement and/or urine contained therein after use by a pet.

A deflection member 28 is integral with and extends upwardly from the rear wall 20 of the base member 12. If the dog 24 is a male dog and urinates on the deflection member 28, it will direct the urine towards the bottom wall 14 of the base member 12 to be disposed of.

The deflection member 28 further includes a pair of side flanges 30, each integral at a right angle to one side edge 32 of the deflection member 28. Each side flange 30 is integral with a portion of a top edge 34 of one side wall 16 of the base member 12 so as to help prevent the urine from splashing out.

The folding mechanism 26 has a plurality of fold lines 36a, and 36b. The first fold line 36a is formed at a forty-five degree angle on the forward corner of each side wall 16. The second fold line 36b is formed at a forty-five degree angle on the rearward corner at the junction of each side wall 4 16 with one side flange 30. The third optional fold line 36c is formed transversely across the middle of the bottom wall 14 and the side walls 16.

The base member 12 and the deflection member 28 are fabricated out of a thin waterproof material, such as cardboard, plastic, metal or the like, which can be folded along their respective edges as indicated by the curve arrows and the fold lines 36a, 36b and 36c for easy disposal of the excrement contained therein after use.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A disposable canine lavatory comprising:

(a) a box shaped base member having a bottom wall, a pair of side walls, a front wall, a rear wall and an open top being of a size to receive a dog thereon, so that said base member can catch excrement from the dog, a deflection member integral with and extending upwardly from said rear wall of said base member so that if the dog is a male dog and urinates on said deflection member, it will direct the urine towards said bottom wall of said base member for ease of disposal thereof, wherein said deflection member further includes a pair of side flanges, each integral at a right angle to one side edge of said deflection member and integral with a portion of a top edge of one said side wall of said base member so as to help prevent the urine from splashing out; and (b) folding means for allowing said base member to be folded up so that said lavatory with excrement for ease of disposal thereof, wherein said folding means is a plurality of fold lines, one formed at a forty-five degree angle on the forward corner of each said side wall, the rearward corner at the junction of each said side wall with one said side flange, wherein said folding means has an additional fold line transversely across the middle of said bottom wall and said side walls.

2. A disposable canine lavatory as recited in claim 1, wherein said base member and said deflection member are fabricated out of a thin waterproof material which can be folded along said fold lines for easy disposal of the excrement contained therein.

* * * * *